US010086846B2

(12) United States Patent
Dalrymple

(10) Patent No.: US 10,086,846 B2
(45) Date of Patent: Oct. 2, 2018

(54) EVACUATED TUBE TRANSPORT SYSTEM

(71) Applicant: David Dalrymple, Templestowe Lower (AU)

(72) Inventor: David Dalrymple, Templestowe Lower (AU)

(*) Notice: Subject to any disclaimer, the term of this patent is extended or adjusted under 35 U.S.C. 154(b) by 199 days.

(21) Appl. No.: 15/044,384

(22) Filed: Feb. 16, 2016

(65) Prior Publication Data
US 2016/0160853 A1    Jun. 9, 2016

Related U.S. Application Data

(60) Division of application No. 13/917,936, filed on Jun. 14, 2013, now Pat. No. 9,290,187, which is a
(Continued)

(30) Foreign Application Priority Data

Dec. 16, 2010  (AU) ................. 2010905504
May 18, 2011   (AU) ................. 2011901931

(51) Int. Cl.
*B61B 13/12*    (2006.01)
*B61B 13/08*    (2006.01)
(Continued)

(52) U.S. Cl.
CPC ............ *B61B 13/122* (2013.01); *B61B 13/08* (2013.01); *B61B 13/10* (2013.01); *F04B 25/005* (2013.01); *F04B 39/10* (2013.01); *Y02T 30/40* (2013.01)

(58) Field of Classification Search
CPC .. B60V 1/00; B60V 3/04; B61B 13/08; B61B 13/10; B61B 13/12; B61B 13/122
(Continued)

(56) References Cited

U.S. PATENT DOCUMENTS 694,129 A     2/1902  Brown
3,443,524 A   5/1969  Schneider
(Continued)

FOREIGN PATENT DOCUMENTS

CA   2235589 A1   5/1997
CN   2937037 A1   8/2007
(Continued)

OTHER PUBLICATIONS

International Search Report and Written Opinion for International Application No. PCT/AU2011/001604, dated May 21, 2012.
(Continued)

*Primary Examiner* — Zachary L Kuhfuss
(74) *Attorney, Agent, or Firm* — Fish & Richardson P.C.

(57) ABSTRACT

A capsule for an evacuated tube transport system, the capsule comprising a capsule body for carrying passengers within an evacuated tube; a first door disposed in a first end of the body; and a first coupling mechanism and a first sealing mechanism arranged respectively to couple the capsule to another capsule at the end of the body while the capsules are moving and to establish a seal around the door and a corresponding door in the other capsule to enable passengers to move from one capsule to another through the doors without exposing the passengers to the pressure of the evacuated tube.

16 Claims, 7 Drawing Sheets

Related U.S. Application Data continuation of application No. PCT/AU2011/001604, filed on Dec. 13, 2011.

(51) Int. Cl.
*B61B 13/10* (2006.01)
*F04B 25/00* (2006.01)
*F04B 39/10* (2006.01)

(58) Field of Classification Search
USPC .................................. 104/23.1, 23.2, 155
See application file for complete search history.

(56) References Cited

U.S. PATENT DOCUMENTS

| | | |
|---|---|---|
| 3,522,773 A | 8/1970 | Edwards |
| 3,757,699 A | 9/1973 | Wirth |
| 4,023,500 A | 5/1977 | Diggs |
| 4,061,089 A | 12/1977 | Sawyer |
| 4,066,021 A | 1/1978 | Helm |
| 4,148,260 A | 4/1979 | Minovitch |
| 4,305,334 A | 12/1981 | Augenreich et al. |
| 4,347,791 A | 9/1982 | Mandros |
| 4,512,258 A | 4/1985 | Matsukata |
| 5,282,424 A | 2/1994 | O'Neill |
| 5,460,098 A | 10/1995 | Jackson et al. |
| 5,619,930 A | 4/1997 | Alimanestiano |
| 5,950,543 A | 9/1999 | Oster |
| 6,374,746 B1 | 4/2002 | Fiske |
| 6,530,444 B2 | 3/2003 | Miyazawa et al. |
| 6,957,610 B2 | 10/2005 | Cummins |
| 9,290,187 B2 * | 3/2016 | Dalrymple .............. B61B 13/10 |
| 2008/0170953 A1 | 7/2008 | Lund |
| 2013/0276665 A1 * | 10/2013 | Dalrymple .............. B61B 13/10 104/23.1 |

FOREIGN PATENT DOCUMENTS

| | | |
|---|---|---|
| CN | 101323306 A1 | 12/2008 |
| DE | 3725671 A1 | 2/1989 |
| DE | 10245709 A1 | 4/2004 |
| GB | 2024750 A1 | 1/1980 |

OTHER PUBLICATIONS

Extended European Search Report for European Application 11848190.2, dated Oct. 11, 2017.

* cited by examiner

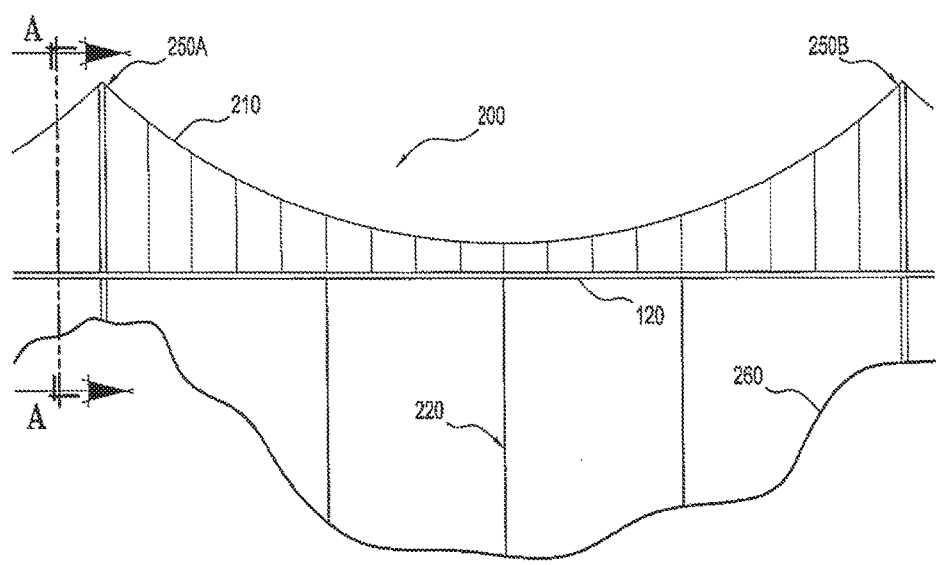
FIG. 2A
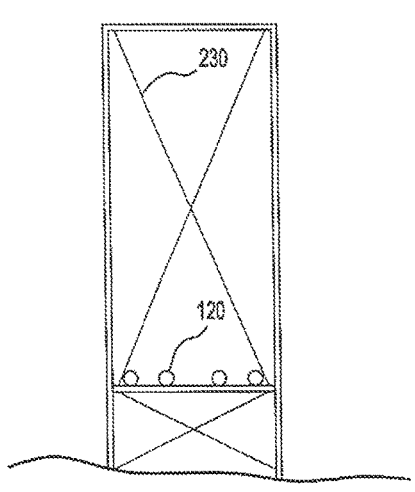 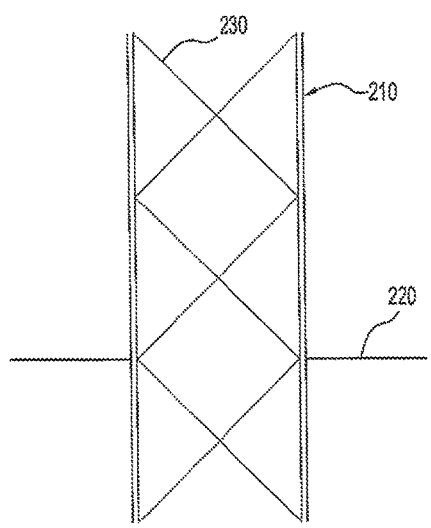
FIG. 2B        FIG. 2C

(DETAIL - A)

EVACUATED TUBE TRANSPORT SYSTEM

CROSS REFERENCE TO RELATED APPLICATIONS

The present application is a continuation of U.S. patent application Ser. No. 13/917,936, filed Jun. 14, 2013, now allowed, which is a continuation of International Application No. PCT/AU2011/001604, filed Dec. 13, 2011, which claims priority from Australian Application No. 2010905504, filed Dec. 16, 2010, and Australian Application No. 2011901931, filed May 18, 2011. The contents of the prior applications are incorporated herein by reference in their entirety.

FIELD

The present invention relates to an evacuated tube transport system as well as a transport method.

BACKGROUND

Trains are the dominant form of ground-based mass-transport. A wide variety of such trains are deployed ranging from diesel and electric powered trains to even more recent deployment of magnetic-levitation based trains. Such trains require significant energy input in order to be driven and, at the speeds they currently achieve, air resistance becomes a significant factor.

One previously suggested alternative is to place a train or capsule in an evacuated tube. By placing the vehicle to be transported in an evacuated tube, the effective air resistance can be reduced allowing for faster or more economical travel. While such systems have been proposed, to the applicant's knowledge, none have been implemented successfully for passenger travel.

Accordingly, there is a need for an alternative evacuated tube based transport system.

SUMMARY OF THE INVENTION

In a first aspect of the invention, there is provided a capsule for an evacuated tube transport system, the capsule comprising:
- a cylindrical capsule body for carrying passengers within an evacuated tube;
- a first door disposed in a first end of the body; and
- a first coupling mechanism and a first sealing mechanism arranged respectively to couple the capsule to another capsule at the end of the body while the capsules are moving and to establish a seal around the door and a corresponding door in the other capsule to enable passengers to move from one capsule to another through the doors without exposing the passengers to the pressure of the evacuated tube.

In an embodiment, the capsule comprises a second door in a second end of the body, a second coupling mechanism and a second sealing mechanism associated with the another door whereby the capsule can be coupled to another capsule at either end of the capsule.

In an embodiment, the capsule comprises a pump associated with at least one of the first and second doors operable to equalise the air pressure in the region between two doors when coupled with the air pressure in a cabin of the capsule.

In an embodiment, the capsule comprises at least one further door in a side of the capsule to enable passengers to enter or exit the capsule when the capsule is stopped.

In an embodiment, the capsule comprises a plurality of spaced apart fluid tanks disposed in a bottom portion of the capsule, the fluid tanks in fluid communication with one another so that fluid can be moved between tanks to alter weight distribution of the fluid.

In an embodiment, the fluid tanks contain baffles to restrict fluid movement within the capsule.

In an embodiment, the capsule comprises a plurality of extendable wheels arranged at radial spacing from one another to enable engagement between the wheels and an interior of the evacuated tube.

In an embodiment, the capsule comprises a first reservoir arranged to be maintained at a pressure higher than the evacuated tube, the first reservoir in fluid communication with a plurality of vents disposed in an underside of the capsule to enable gas to be vented from the first reservoir to form a gas cushion under the capsule.

In an embodiment, the capsule comprises at least one inlet via which gas is injected into the capsule to maintain the first reservoir at a pressure higher than the evacuated tube.

In an embodiment, the capsule comprises a holding reservoir in fluid communication with the inlet and the first reservoir such that gas injected into the capsule is held in the holding reservoir prior to being moved to the first reservoir.

In an embodiment, the capsule comprises at least one pressure controlled non-return valve between the holding reservoir and the first reservoir.

In an embodiment, the capsule comprises a cabin arranged to be maintained at a first pressure suitable for carrying passengers and a second reservoir disposed between the first reservoir and the cabinet and arranged to be maintained at a pressure lower than the first pressure.

In a second aspect of the invention, there is provided an evacuated tube transport system comprising:
- a tube extending between an origin and a destination;
- a capsule disposed within the tube, the capsule comprising at least one indented region on an underside of the capsule;
- a plurality of gas injectors disposed between the origin and the destination for injecting gas into the evacuated tube as the capsule passes the gas injector to apply the gas to the at least one indented region to thereby apply motive force to the capsule and maintain a cushion of gas underneath the capsule.

In an embodiment, the gas is compressed air.

In an embodiment, the at least one gas injector is angled relative to the direction of travel to apply motive force in the direction of travel.

In an embodiment, the evacuated tube transport system further comprises at least one gas injector angled relative to the direction of travel of the capsule to apply braking to the capsule.

In an embodiment, the evacuated tube transport system comprises a plurality of spaced apart vacuum pumps for evacuating the tube.

In an embodiment, the evacuated tube transport system comprises at least one launching mechanism comprising:
- a plate member moveable into the tube; and
- a launching gas injector arranged to inject gas into the tube between the launching plate and a capsule disposed in the tube proximate the plate to thereby launch the capsule.

In an embodiment, the evacuated tube transport system comprises a capsule inserting mechanism comprising two tube sections disposed next to one another, a mechanism for moving each of the tube sections between an operative position in which the tube section is connected with the evacuated tube and an inoperative position in which the tube section is not connected to the tube, and a sealing mechanism for maintaining the pressure of the evacuated tube during movement of the tube sections.

In a third aspect of the invention, there is provided an evacuated tube transport system comprising:

a plurality of capsules, each capsule comprising a cylindrical capsule body for carrying passengers within the evacuated tube, first and second doors disposed respectively in first and second ends of the body, first and second coupling mechanisms and first and second sealing mechanisms disposed respectively in first and second ends of the body;

an origin launching mechanism arranged to launch at least one originating capsule of the plurality capsules from an origin such that it travels towards a destination;

an intermediate launching mechanism located at a first intermediate position intermediate the origin and the destination, the intermediate launching mechanism arranged to launch at least one injected capsule of the plurality of capsules in advance of the travelling originating capsule whereafter the coupling and sealing mechanisms of the respective doors form a connection between a rearwards most door of the injected capsule and a forwards most door of the originating capsule whereby passengers may move through the coupled capsules such that passengers intending to disembark at a second intermediate position may move to a rearwards most capsule without being exposed to the pressure of the evacuated tube and the rearwards most capsule may be decoupled to allow the rearwards most capsule to be brought to a halt at the second intermediate position.

In a fourth aspect of the invention, there is provided a transport method comprising:

launching one of a plurality of capsules from an origin with an origin launching mechanism such that it travels towards a destination, each capsule comprising a cylindrical capsule body for carrying passengers within the evacuated tube, first and second doors disposed respectively in first and second ends of the body, first and second coupling mechanisms and first and second sealing mechanisms disposed respectively in first and second ends of the body;

launching at least one injected capsule of the plurality of capsules in advance of the travelling originating capsule with an intermediate launching mechanism located at a first intermediate position intermediate the origin and the destination;

forming a connection between a rearwards most door of the injected capsule and a forwards most door of the originating capsule with the coupling and sealing mechanisms of the respective doors whereby passengers may move through the coupled capsules such that passengers intending to disembark at a second intermediate position may move to a rearwards most capsule without being exposed to the pressure of the evacuated tube;

decoupling the rearwards most capsule to allow the rearwards most capsule to be brought to a halt at the second intermediate position such that the passengers can disembark.

In a fifth aspect of the present invention, there is provided a gas compression/vacuum system for providing compressed gas and creating a vacuum for the operation of an evacuated tube transport system, the gas compression/vacuum system comprising:

a support structure for supporting part of the tube transport system, the support structure having at least a first member and a second member;

a first piston housed in the first member which is operable to move within the first member to compress gas or create a vacuum in the first member; and a second piston housed in the second member which is operable to move within the second member to compress gas or create a vacuum in the second member.

In an embodiment, the first and second pistons are connected to each other whereby movement of one of the pistons causes movement of the other piston in the opposite direction.

In an embodiment, the support structure comprises at least one tank for holding liquid, the liquid for use in causing movement of the pistons.

Other aspects, features and advantages of the invention will be apparent from the following description.

BRIEF DESCRIPTION OF THE DRAWINGS

Referring to the Figures there is shown an evacuated tube transport system in accordance with embodiments of the invention. In the drawings:

FIGS. 2A, 2B and 2C illustrate a manner in which an evacuated tube may be suspended above a landscape;

DETAILED DESCRIPTION

Figure 1:
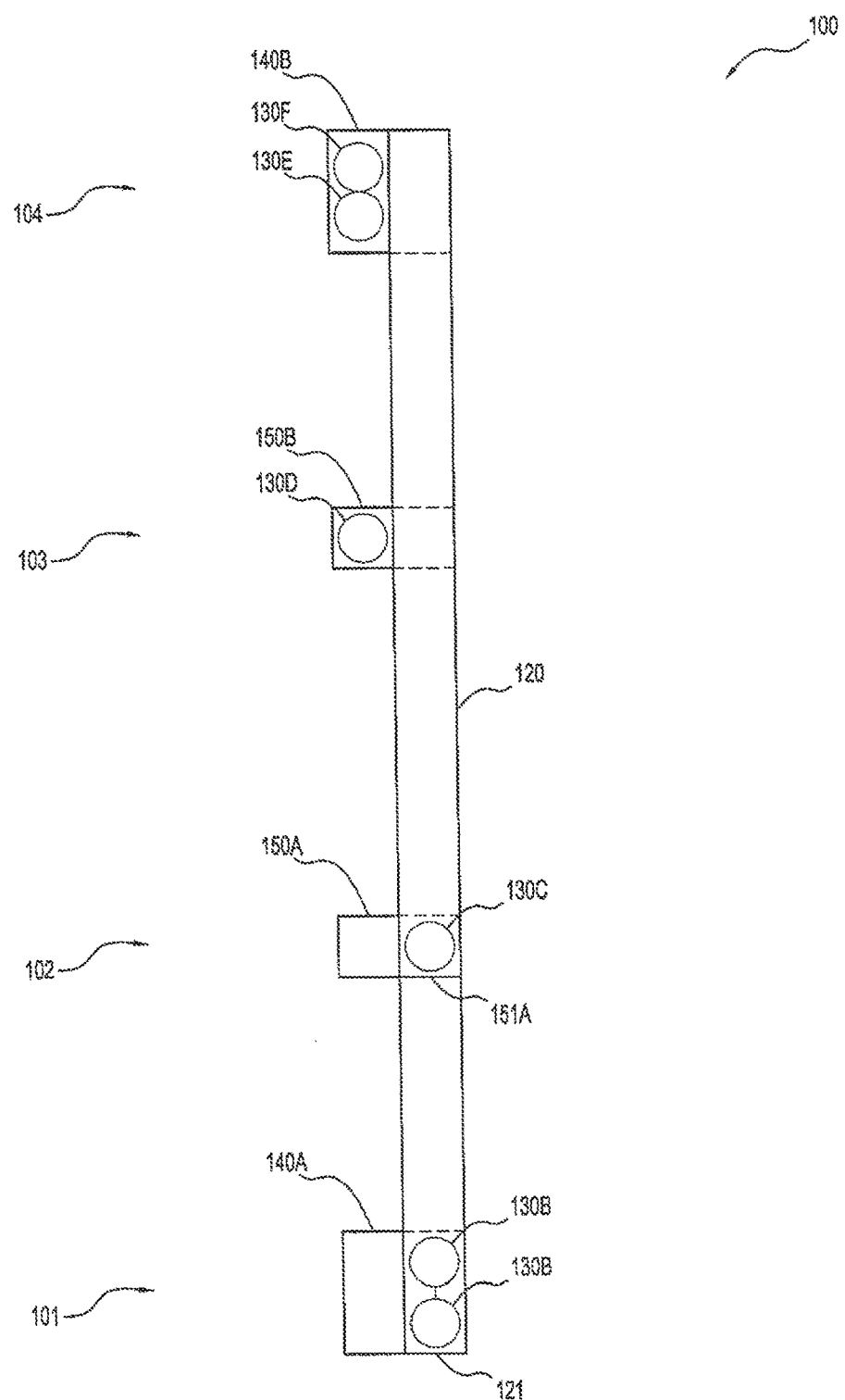
FIG. 1 is a schematic plan of an evacuated transport system of an embodiment of the invention.

The drawings show an evacuated tube transport system 100 and a capsule 130 for the evacuated tube transport system 100. The evacuated transport system is capable of moving passengers and freight from an origin station 101 to a destination station 104. Embodiments of the invention allow capsules to be picked up and dropped off at intermediate stations 102, 103 while at least one capsule continues to move. As will be described in further detail below, the capsules 130 are moved within the evacuated tube 120 by the application of compressed air both at the origin and at spaced apart locations along the evacuated tube 120. The injected air is removed by spaced apart vacuum pumps in order to maintain the evacuated pressure of the tube. Compressed air is injected to the underside of the capsules both to apply motive force and to assist in the establishment of a cushion of compressed air underneath the capsule such that the system takes advantage of the so-called hovercraft effect.

Referring to FIG. 1 there is shown a schematic plan view of an evacuated tube transport system 100 in accordance with an embodiment of the invention.

In FIG. 1, the capsules 130 are represented by circles, although in practice the capsules are cylindrical so as to act in effect as a piston travelling within a cylinder formed by the evacuated tube 120. In FIG. 1 two capsules 130A, 130B are located at an origin station 101. In order to launch the capsules 130A, 130B, compressed air is injected into the evacuated tube between the rearward most capsule 130A and an end 121 of the evacuated tube. The compressed air applies a motive force to the rear of the capsule 130A. This force is transferred through a coupling to the forward most capsule 103B. Accordingly, the injection of compressed air causes the capsule to begin travelling towards the destination station 104.

Figure 4:
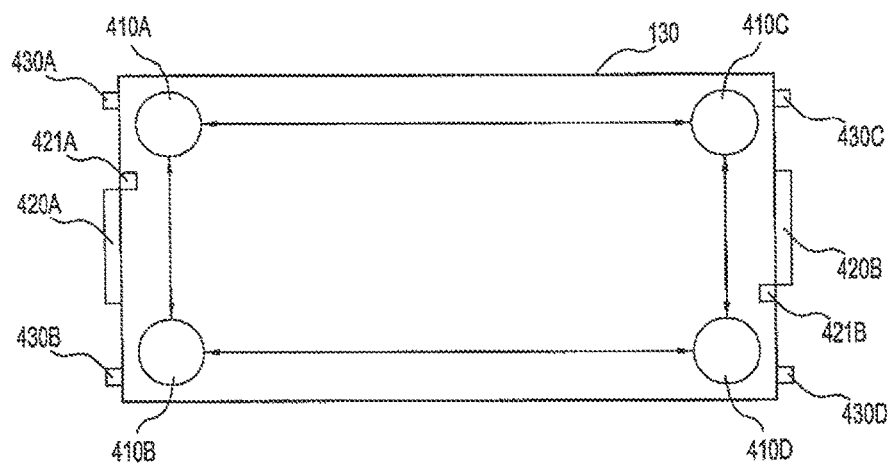
FIG. 4 is a schematic plan view of a capsule of an embodiment.

The system 100 is operated in order to allow additional capsules to be inserted into the tube at the intermediate positions of intermediate stations 102, 103 and for capsules to be dropped off at these stations 102, 103 without the other capsules coming to a rest. To this end, as shown in FIG. 4, each capsule 130 has a first door 420A and a second door 420B which enables a passenger to enter and exit the capsule into another capsule when the capsules are appropriately joined together as will be described in further detail below.

As the capsules 130A, 130B approach the intermediate destination 102, a third capsule 130C is moved into the tube by means of capsule insertion/extraction mechanism 150A. Each capsule insertion/extraction mechanism comprises a pair of tube sections of the approximate length of the number of capsules that they are intended to insert. FIG. 1 shows two dual capsule insertion mechanisms 140A,140B and two singular capsule insertion mechanism 150A,150B. The insertion/extraction mechanism 150A has a launching mechanism which includes a metal plate 151A which is slid into the tube while maintaining the vacuum such that compressed air can be inserted into the tube between the metal plate 151A and capsule 130C to cause the capsule to begin to move. Accordingly the capsule 130C is accelerated in advance of capsule 130B such that the pace of the capsule 130C matches the pace of capsule 130B when capsule 130B catches up to capsule 130C. Capsule 130A will be dropped off at intermediate station 102. Accordingly, all passengers who wish to disembark at first intermediate station 102 ensure that they are in capsule 130A by the time it is to be decoupled from capsule 130B. According to the embodiment, passengers who wish to, can disembark at second intermediate station 103 irrespective of whether they got on at the first intermediate station 102. In this respect, it will be appreciated that once capsule 130A has been decoupled and capsule 130B has caught up to capsule 130C, there will be a train comprised of capsules 130B and 130C travelling towards the second station 103. Passengers wishing to disembark at station 103 who are in capsule 130C move through the doors 420 of capsules 130C and 130B into capsule 130B. Any passengers not wishing to disembark at the second intermediate station move into capsule 130C. As the capsules approach the second intermediate destination, capsule 130D will be moved from the retracted position shown in FIG. 1 to an inserted position and accelerated in advance of capsules 130B, 130C. Capsule 130B will be decoupled and brought to a stop at the second intermediate station allowing passengers to disembark. Capsule 130C will join capsule 130D and proceed towards the destination station 104 where both capsules 130C, 130D will be brought to a stop.

As shown in FIG. 1 two further capsules 130E and 130F can be held in the extracted position in the capsule extraction/injection mechanism 140B at the destination until capsules 130C and 130D arrive. At this point, the capsules 130E, 130F can be inserted into the system while capsules 130C, 130D are moved to an extracted position outside of the evacuated tube and passengers can disembark. While in this example, a single tube is described, in other embodiments, there may be pairs of tubes one for the outward journey and another for the return journey. In such an embodiment, capsules 130C, 130D are moved to an extracted position where passengers disembark. Other passengers then board capsules 130C and 130D before the capsules are inserted into the return tube.

While the preferred embodiment shows capsules being moved into and out of the evacuated tube by insertion/extraction mechanisms 140,150 persons skilled in the art will appreciate that in some other embodiments it will not be necessary to remove the capsules from the tube. For example, a capsule at the destination can be left in the tube until it is desired to launch it again and passengers can be disembarked through a side door in the capsule by sealing that to an appropriate port in a wall in the evacuated tube. An example of such a side door 311 is shown in the cabin 310 of the capsule 130 in FIG. 3. In one advantageous embodiment, capsules 130 are propelled in a fixed sequence within the tube such that it is not necessary to add or remove capsules from the tube and compressed air is applied solely to the underside and rear of the capsule. Further, in embodiments where insertion/extraction mechanisms 140,150 are used, the mechanism need not always be used, for example an express capsule can pass an intermediate station.

FIG. 2 illustrates that in the preferred embodiment the evacuated tube 120 is advantageously supported by a series of suspension bridges. This allows the tube 120 to be supported above the ground 260. FIG. 2A shows one section 200 of suspension bridge having main suspension cables 210 and stabilising cables 230 which hold the evacuated tube 120 between adjacent towers 250A, 250B. Lateral cables 220 provide additional stabilisation and bracing.

FIG. 2B is a view along a section identified by lines A-A in FIG. 2A and shows that in embodiments of the invention there may be more than one evacuated tube, specifically FIG. 2B shows four such tubes. FIG. 2C is a plan view showing the arrangement of the stabilising cables 230.

One advantage of the system is that it is not necessary to disrupt the existing landscape 260 as the evacuated tube can be held at a position above the landscape such that the landscape is still usable. This can reduce the cost of installation as the entirety of the underlying land does not need to be purchased outright. Further, as there will not be many capsules in a length of evacuated tube at any time, relatively long spans can be achieved between neighbouring towers 250A, 250B.

Figure 3:
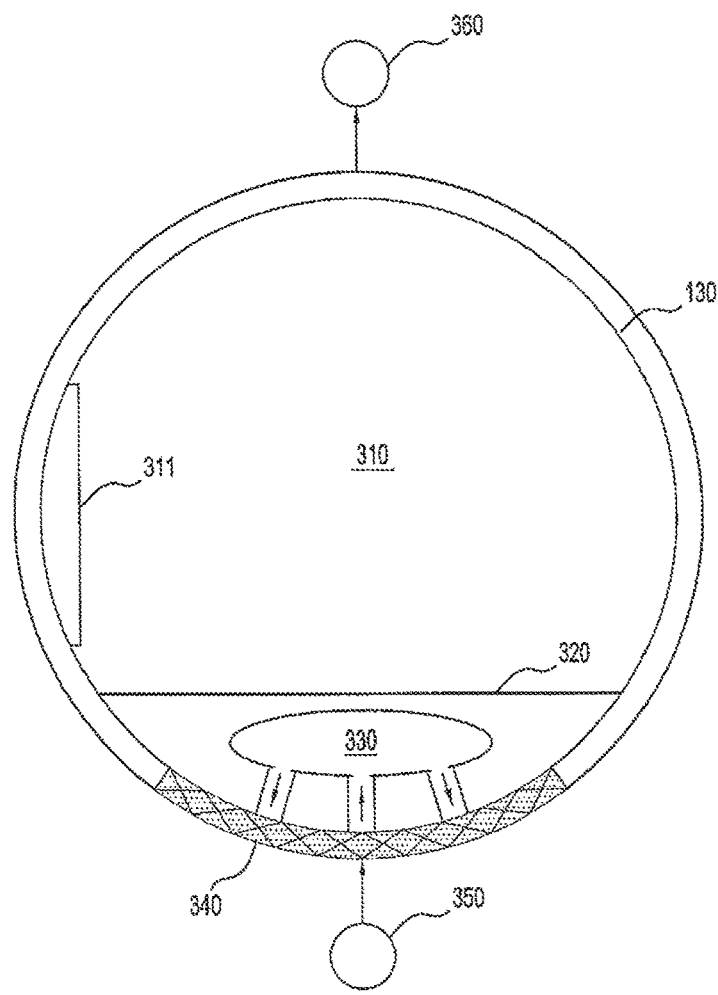
FIG. 3 is a schematic cross-sectional diagram of the capsule of an embodiment.

FIG. 3 shows schematically the manner in which the evacuated transport system operates. Along the length of the evacuated tube 120 are periodically placed compressed air injectors 350 and vacuum pumps 360. The compressed air injectors are used to inject air to the under surface of the capsule and against the end of the capsule. The injectors are angled relative to the path of travel either to apply force in the direction of travel or force against the direction of travel in order to brake the capsule. The capsule 130 contains an air reservoir in the form of a pressure chamber 330 (or a plurality of air reservoirs) under the floor 320 of cabin 310. Compressed air finds its way into the reservoir via an inlet 520 and then is vented outwardly to form an air cushion 340 underneath the capsule 130. The pressure chamber 330 can also be used to supply fresh air to the cabin 310.

Figure 5:
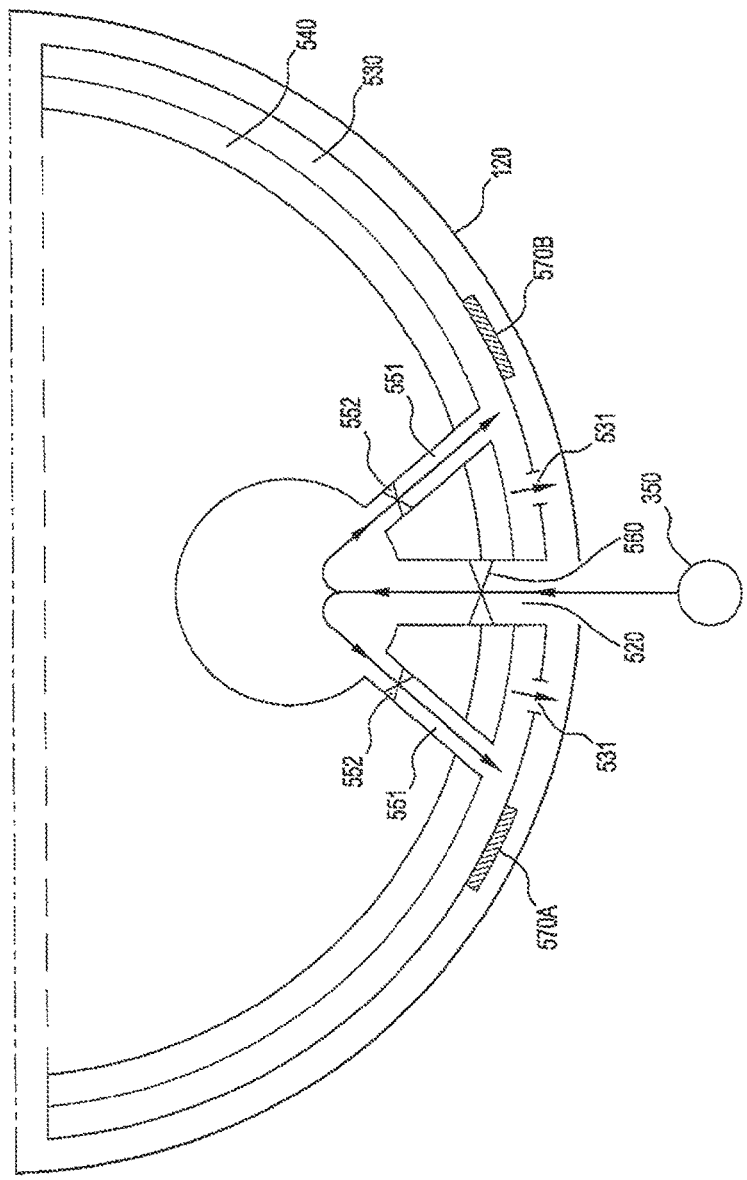
FIG. 5 is a detail a mechanism for compressed air delivery of an embodiment.

The air inlet and vents are shown in more detail in FIG. 5. The capsule has two cavities 530, 540 which extend around the circumference of the capsule. The first cavity 540 is evacuated to provide for sound and thermal insulation. The first cavity can be used as a source of vacuum, for example to remove stale air from the cabin or to assist in docking as described below. The second cavity 530 is filled with compressed air in order to produce the hovercraft effect 340 described previously. Specifically, air injector 350 injects air through a valve 510 in the floor of the evacuated tube 120. The air is admitted into the air reservoir 330 via inlet 520 which incorporates a one way pressure valve 560. The air is injected at a higher pressure than the pressure in the second annular cavity 530 and accordingly can be controlled to flow via pressure valves 552 through venting outlets 551 and ultimately out through vents 531 in the base of the capsule to deliver jets of air which provide the hovercraft effect. Longitudinal members 570A,570B help confine the air in the desired area to aid the hovercraft effect.

Figure 6A:
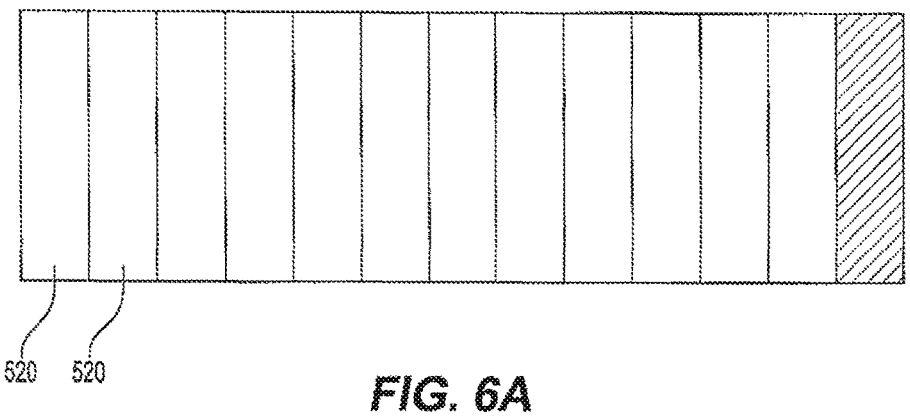
FIGS. 6A and 6B show detail of a set of adjustable air inlets.
Figure 6B:
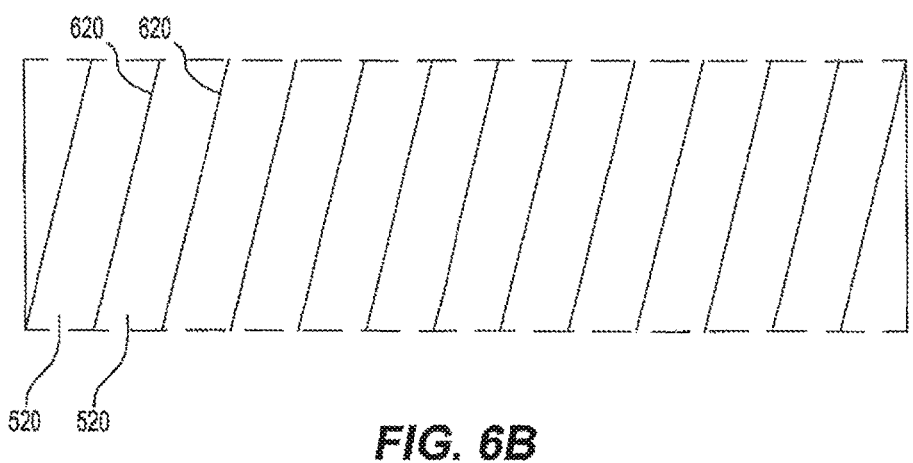

One example of an inlet structure is shown in FIGS. 6A and 6B from which will be appreciated that a plurality of inlets are provided in the base of the capsule. The inlets take the form of a plurality of blades 620 such that motive force can be applied and the air then finds its way into the reservoir as described above. The blades are mounted for pivotal movement so that there angles can be adjusted (and hence the air inlets can be adjusted). This allows adjustment of both drive and air intake.

In one embodiment, a plurality of automatic pressure sensitive valves disposed along the length of the evacuated tube can be used to bring the system to a halt by opening the tube to atmospheric pressure in an emergency.

Referring to FIG. 4, further features of the invention are shown. As described above, the capsules can be coupled while they are moving. To this end, the capsule includes a plurality of magnetic couplers 430. The couplers which are diagonally opposed to one another have the same polarity whereas the couplers on each end have different polarities. Thus, couplers 430A and 430D have one polarity and couplers 430B and 430C have the other polarity such that they will magnetically couple. One door acts as a socket while the other door is a spigot such that one door is received inside the other and seals (e.g. o-rings), seal the doors. Pumps 421 are co-located with the doors 420 to align the pressure in the area trapped between the doors with the cabin in a manner advantageous to operation of an air lock.

In another embodiment, coupling can be achieved using flat hinged grappling hooks or other suitable coupling. In some embodiments the onboard sources of pressure and vacuum can be used to cushion the docking process and increase the strength of the coupling respectively.

Ceramic rings at each end of the capsule act as piston rings which can admit cold compressed air from the capsule to maintain separation of the capsule from the tube or in the event of a system failure.

The capsule has electrically driven wheels disposed, for example at each end at different radiuses. In one example, they are disposed relative to the 12 midday orientation of the capsule at 60, 180 and 300 degrees and are arranged to engage the tube as necessary, for example when docking at a station or in the case of power failure.

The capsule has an electricity supply supplied by a plurality of replaceable or rechargeable battery packs. In one embodiment, a compressed air turbine generator is disposed in an inlet to recharge the batteries. The electricity supply can be used to power lights, heating, cooling etc. In some embodiments, the air in the cabin is sufficient for the journey between each station where it can be re-supplied. In other embodiments, it may be resupplied from the injected air. Similarly, water and sewerage can be added and removed from the capsules when they are docked.

Any fire in the cabin can then be extinguished by evacuated cavity 540 by means of valves connecting it to the cabin which will reduce the relative portion of the oxygen in the air.

The capsule has an electricity supply supplied by a plurality of replaceable battery packs. The air in the cabin can be supplied from air on board the capsule, for example from the air cylinder. Similarly, water and sewerage can be added and removed from the capsules when they are docked and undocked.

As described above, in order to insert capsules into the tube a replacement tube can be moved laterally on rails placing the second tube in-line with the evacuated tube. A pair of steel plates are contained at the end of each tube and are slideably movable in either direction and are sealed with a pressurised gasket. When it is desired to launch the capsule the front steel plate is removed while the rear steel plate is left in place. The two joints in the main tube are sealed by two sliding outer tubes with gaskets.

Figure 7:
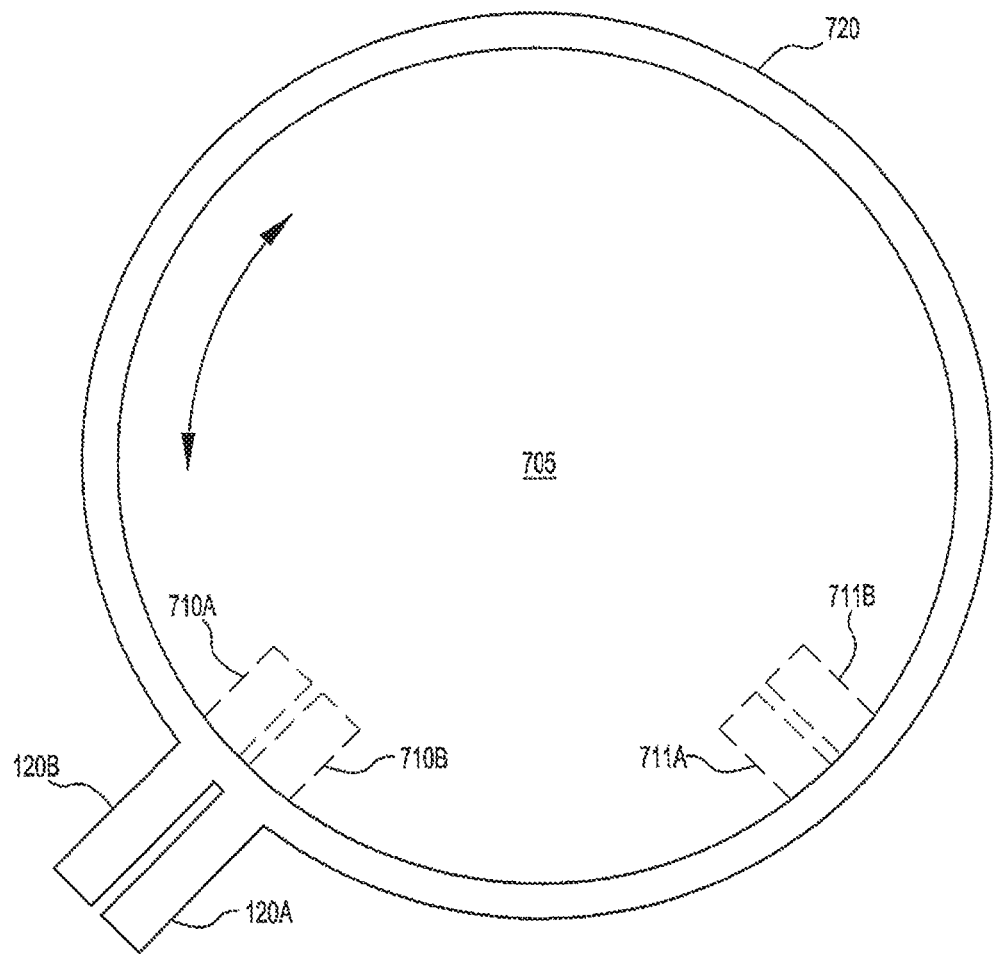
FIG. 7 is a schematic plan of an alternative capsule docking station.

Persons skilled in the art will appreciate that the lateral movement of a single pair of tubes is not the only manner in which additional tubes can be brought in line. For example, a rotating barrel of tubes can be used to bring the tubes in line. Persons skilled in the art will appreciate that other mechanism can be used to exchange capsules during loading and unloading. FIG. 7 shows an example of an alternative docking station. Capsules arriving via tubes 120A,120B are received in docking areas 710A,710B of turntable 705 mounted within support structure 720 from which passengers can access the capsules.

Other docking areas are located around the perimeter of the turntable 705. Thus, for example, docking areas 711A, 711B can be brought into alignment with tubes 120B,120A by rotating the turntable. The turntable is in the form of a 30 m diameter cylinder which is displaceable along its vertical axis (as well as being rotatable. This allows, a plurality of tubes 120 to be mounted at different heights relative to the docking station and for capsule to be moved between tubes 120 at different heights.

Figures 8, 9:
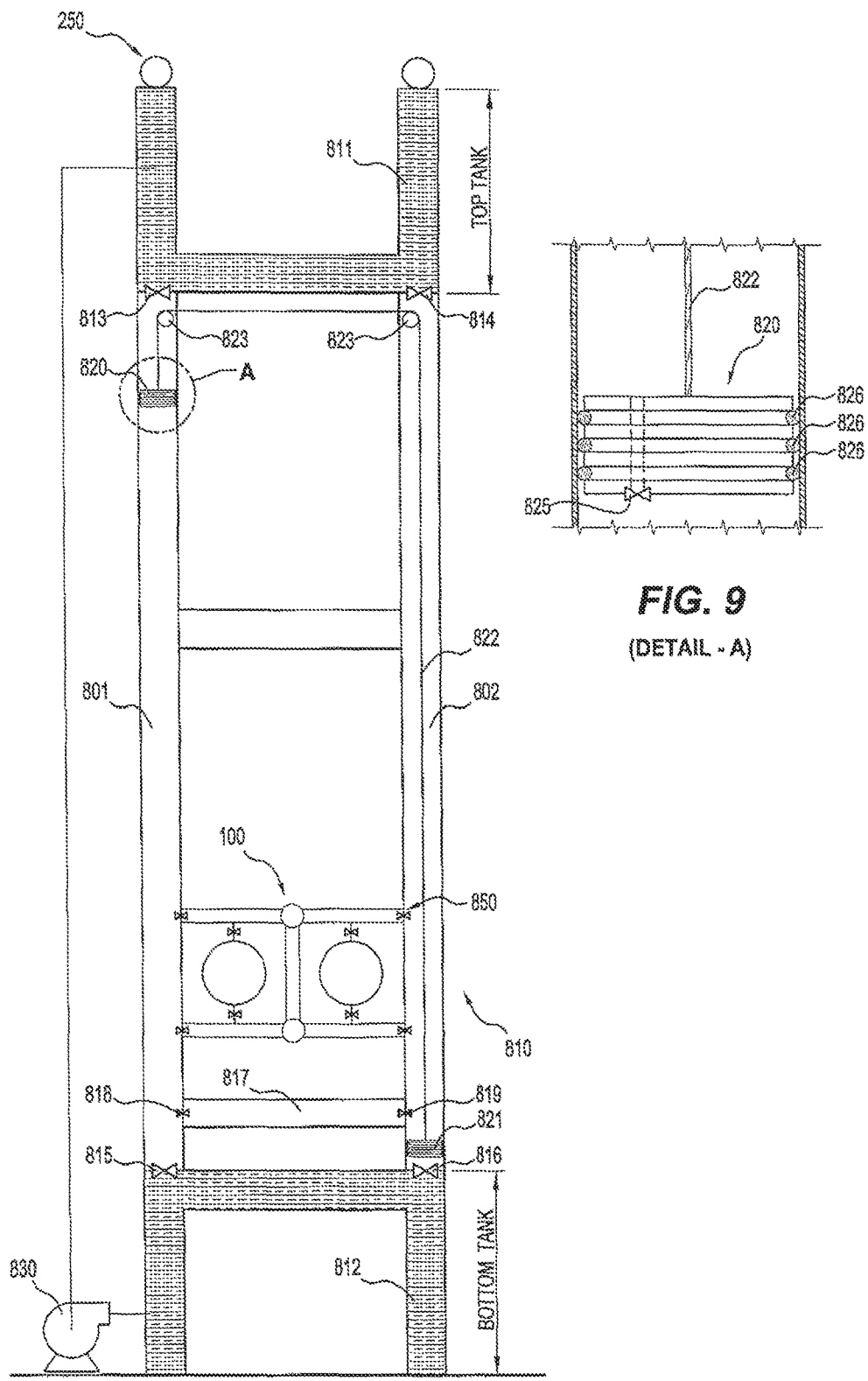
FIG. 8 is schematic of a system for providing compressed gas and creating the vacuum required for the evacuated tube transport system.
FIG. 9 is a schematic of a piston of the gas compression/vacuum system of FIG. 8.

FIG. 8 shows another embodiment of the invention in which the towers 250 of the suspension bridges shown in FIG. 2 can be used in providing compressed gas and creating the vacuum required for the tube transport system 100. Typically, the gas is air, but in other embodiments other suitable gases may be employed. The tower 250 shown in FIG. 8 and in particular the tower's columns 801, 802 and at least some of the cross-members are constructed from hollow members in the form of steel tubes. A gas compression/vacuum system 810 is provided within the hollow members of the tower 250. The compression/vacuum system 810 comprises upper and lower tanks 811, 812 for holding liquid. Typically this liquid is water but in other embodiments other liquids such as oil might be used. At least part of the upper tank 811 comprises upper portions of the tower's columns 801, 802 and at least part of the lower tank comprises lower portions of the tower's columns. The upper tank 811 has first and second valves 813, 814 which open to the respective columns 801, 802 and the lower tank 812 has third and fourth valves 815, 816 which open to the respective columns.

The compression/vacuum system 810 also comprises a release conduit 817 for releasing liquid that has entered the first or second columns 801, 802 of the tower during operation of the compression/vacuum system 810 into the lower tank 812. Although it is to be appreciated that the release conduit 817 could be configured to release liquid to the upper tank 811 or to both tanks. The release conduit 817 in the embodiment shown in FIG. 8 comprises a hollow member extending between the tower columns 801, 802. The release conduit 817 is located above and spaced from the lower tank 812 and has release valves 818, 819 located at respective first and second ends of the conduit.

The gas compression/vacuum system 810 also comprises first and second pistons 820, 821 respectively located in the tower's columns 801, 802 between the upper and lower tanks 811, 812. The pistons 820, 821 are connected to each other by means of a cable 822 supported on appropriate pulleys 823. The pistons 820, 821 are able to move vertically within their respective columns. FIG. 9 shows one of the pistons in greater detail. Each piston is provided with sealing rings 826 to form a seal with the inner surface of its respective column. A piston valve 825 is provided on each piston to enable fluid to flow through the piston, which may be particularly useful during maintenance of the compression/vacuum system and resetting the system mid-cycle.

FIG. 8 shows an initial condition for the gas compression/vacuum system 810, which operates cyclically. In this initial condition, the upper tank 811 holds a substantially greater volume of liquid than the lower tank 812 and first to fourth valves 813-816 are closed. One piston 820, in this initial condition, is located in an upper portion of its column 801 and the other piston 820 is located in a lower portion of its column 802. The piston valves 825 of each piston 820, 821 and the release valves 818, 819 of the release conduit 817 are also closed.

Operation of the gas compression/vacuum system 810 begins by opening the first valve 813 (keeping the second-fourth valves 814-816, the release valves 818, 819 and the piston valves 825 closed). As a result liquid flows from the upper tank 811 into the column 801 pushing the first piston 820 down and compressing the gas beneath the piston 820. At the same time, the downward movement of the first piston 820 causes the second piston 821 to be drawn upwards in the second column 802, reducing the gas pressure (i.e. creating a "vacuum") below the second piston 821.

As shown in FIG. 8, the transport system 100 is connected to both of the columns 801, 802. The transport system 100 is provided with suitable valve assembly 850 to draw off compressed gas and utilise the vacuum created by the gas compression/vacuum system 810 within the columns 801, 802 as required.

Once the first piston 820 has reached its maximum lower position in the first column 801 and the compressed gas and vacuum have been substantially used by the transport system 100, the gas compression/vacuum system 810 is 'reset' in order for system 810 to begin another process of compressing gas and creating a vacuum but in opposite columns of the tower 250 this time. It is noted that the maximum lower position of the piston is below the release conduit 817. The 'resetting' of the system 810 involves closing the first valve 813 of the upper tank 811 followed by opening the both release valves 818, 819 as well as the fourth valve 816 of the lower tank 812. This enables the liquid that has flowed into the first column 801 from the upper tank 811 to be released from the first column into the lower tank via the release conduit 817. Once all the water has been delivered from the first column 801 to the lower tank 812 the valves 816, 818, 819 are closed. The system 810 is also reset by operating appropriate valving to allow gas into the second column 802 thereby resetting its internal gas pressure to atmospheric.

The gas compression/vacuum system 810 is then ready for the next stage of the cycle in which second valve 814 of the upper tank 811 is opened (whilst keeping first, third and fourth valves 813, 815, 816, the release valves 817, 818 and the piston valves 825 closed). This enables liquid to flow from the upper tank 811 into the second column 802 pushing the second piston 821 down and compressing the gas beneath the piston 821. At the same time, the downward movement of the second piston 821 causes the second piston 821 to be drawn upwards in the first column 801, reducing the gas pressure (i.e. creating a "vacuum") below the first piston 820. At the end of this step in the cycle, liquid is released from the second column 802 by opening the release valves 818, 819 and the third valve 815 of the lower tank 811 so that liquid flows from the second column 802 and into the lower tank 811 via the release conduit 817. The system 810 is once again reset.

It is noted that the transport system 100 is arranged so that its compressed gas and vacuum lines can draw off compressed gas and utilise the vacuum created in either of the columns 801, 802 as determined by which phase of the operating cycle the gas compression/vacuum system 810 is in.

The gas compression/vacuum system 810 also comprises a pump 830 for returning liquid from the lower tank 812 to the upper tank 811 to facilitate continual operation of the system 810. The pump 830 may be powered by any suitable means, but preferably is powered by solar panels, wind turbines or any other source of renewable energy. The pump 830 typically operates semi-continuously for example if it is powered by solar panels.

The gas compression/vacuum system 810 is configured so that there is always sufficient liquid in the upper tank 811 to enable operation of the gas compression and vacuum creation cycle. Because the pump 830 may only operate semi-continuously, for example only during daylight hours, this requires:

Providing sufficient liquid in the system so that when the pump 830 can operate there is liquid in the lower tank 812 for it to pump and so that there is always sufficient liquid in the upper tank 811 for the pistons 820, 821 to operate to compress gas and create a vacuum in the columns 801, 802;

Designing the tanks 811, 812 to be of sufficient volume to hold the liquid required for the system 810

Configuring timing for the operation of the pump 830 with the operation of the gas compression and vacuum creation cycle to ensure that the pump 830 is operating whilst there liquid in the lower tank 812.

Persons skilled in the art will appreciate that the transport system 100 can also be used for freight with the capsules being removed at relevant positions. In one embodiment, some tubes are used for freight and others for passengers. For example, referring to FIG. 2B, two tubes may be used for passengers and two for freight. In other embodiments freight, for example premium freight, may be carried in passenger capsule by attendants moving the freight from capsule to capsule (e.g. using trolleys) to ensure it is deposited at the correct location.

Persons skilled in the art will appreciate that the transport system can run effectively with compressed air with air compressors being used to feed the air injectors 350. However, the injected gas could be of a different mix to air. For example, the oxygen content could be reduced to reduce the risk of fire.

Persons skilled in the art will appreciate that the invention has a number of advantages. In particular because of the low air pressure in the evacuated tube, the capsules can run at significant speeds without effective air resistance. The speed will vary from embodiment to embodiment and will depend on the distance between stations as there needs to be sufficient time to accelerate the capsules up to near the cruising speed so that capsules can be docked while moving.

Persons skilled in the art will appreciate that the tube protects the capsules from an external weather. The tube can be formed of any suitable material such as steel or carbon fibre. In some embodiments, plastic or plastic composite materials may be appropriate for the tube. Longitudinal holes could be provided within the wall of the tube to reduce the required volume of material to make the tubes. As compressed air is used to power the system, no dangerous or explosive materials are involved in powering the vehicle.

Persons skilled in the art will appreciate that the evacuated tubes could be disposed, where possible above existing railway lines so as to supplement existing railway systems. The capsules are designed to carry approximately 80 passengers, the tube itself is approximately 3 meters in diameter. The space in-between the cavities 540,530 is approximately 150 mm.

Persons skilled in the art will appreciate that in other embodiments fuel cells may be used or external combustion used to provide the compressed air, for example using a hydrogen pipe beneath the main tube. In other embodiments, the air compressors can be powered by electricity.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gas compression/vacuum system for providing compressed gas and creating a vacuum for the operation of an evacuated tube transport system, the gas compression/vacuum system comprising:
a support structure for supporting part of the tube transport system, the support structure having at least a first member and a second member;
a first piston housed in the first member which is operable to move within the first member to compress gas or create a vacuum in the first member; and
a second piston housed in the second member which is operable to move within the second member to compress gas or create a vacuum in the second member, wherein the first and second pistons are connected to each other whereby movement of one of the pistons causes movement of the other piston in an opposing direction.

2. A system as claimed in claim 1, wherein the support structure comprises at least one tank for holding liquid, the liquid for use in causing movement of the pistons.

3. A system as claimed in claim 2, wherein the support structure comprises upper and lower tanks, wherein the upper tank has a substantially greater volume than the lower tank.

4. A system as claimed in claim 3, wherein movement of one of the pistons is caused by liquid flowing from the upper tank into the member in which the piston is located.

5. A system as claimed in claim 4, wherein each member has a release valve operable to release liquid that has flowed into the member from the upper tank into the lower tank via a release conduit.

6. A system as claimed in claim 1 incorporated into an evacuated tube transport system comprising:
an evacuated tube extending between an origin and a destination;
a capsule disposed within the tube, the capsule comprising at least one inlet on an underside of the capsule; and
a plurality of gas injectors disposed between the origin and the destination for injecting gas into the evacuated tube as the capsule passes the gas injector to apply the gas to the at least one inlet to thereby apply motive force to the capsule and maintain a cushion of gas underneath the capsule; wherein
the gas compression/vacuum system is adapted to provide compressed gas to the gas injectors and to create a vacuum in the tube.

7. A system as claimed in claim 6, wherein at least one gas injector is angled relative to the direction of travel to apply motive force in the direction of travel.

8. A system as claimed in claim 6, wherein at least one gas injector is angled relative to the direction of travel of the capsule to apply braking to the capsule.

9. A system as claimed in claim 6, comprising at least one launching mechanism comprising:
a plate member moveable into the tube; and
a launching gas injector arranged to inject gas into the tube between the launching plate member and a capsule disposed in the tube proximate the plate to thereby launch the capsule.

10. The system of claim 9, further comprising a pair of plate members at spaced intervals along the evacuated tube, wherein the pair of plate members can be selectively activated to block or unblock the evacuated tube.

11. The system of claim 10, wherein the pair of plate members comprise a first plate member and a second plate member, wherein the first and the second plate members are simultaneously actuatable to block or unblock the evacuated tube, thereby isolating an intervening portion of the evacuated tube, the intervening portion disposed between the first and second plate members.

12. The system of claim 10, wherein each of the plate members is independently actuatable.

13. The system of claim 10, wherein the intervening portion of the evacuated tube comprises at least one inlet facilitating the ingress of air into the evacuated tube to apply at least one of motive force and braking force to the capsule.

14. A system as claimed in claim 6, comprising a capsule inserting mechanism comprising two tube sections disposed next to one another, a mechanism for moving each of the tube sections between an operative position in which the tube section is connected with the evacuated tube and an inoperative position in which the tube section is not connected to the tube, and a sealing mechanism for maintaining the pressure of the evacuated tube during movement of the tube sections.

15. A system as claimed in claim 1, wherein the gas is compressed air.

16. A gas compression/vacuum system for providing compressed gas and creating a vacuum for the operation of an evacuated tube transport system, the gas compression/vacuum system comprising:
- a support structure for supporting part of the tube transport system, the support structure having at least a first member and a second member;
- a first piston housed in the first member which is operable to move within the first member to compress gas or create a vacuum in the first member;
- a second piston housed in the second member which is operable to move within the second member to compress gas or create a vacuum in the second member, and
- the support structure comprises at least one tank for holding liquid, wherein in use, the liquid flows from the tank and contacts the first piston causing movement of the first piston, such that movement of the first piston causes movement of the second piston.

* * * * *